US007907753B2

(12) United States Patent
Wilson et al.

(10) Patent No.: US 7,907,753 B2
(45) Date of Patent: Mar. 15, 2011

(54) ACCESS CONTROL SYSTEM WITH SYMBOL RECOGNITION

(75) Inventors: Jeremy Craig Wilson, Delta (CA); David Black, Delta (CA)

(73) Assignee: Honeywell International Inc., Morristown, NJ (US)

( * ) Notice: Subject to any disclaimer, the term of this patent is extended or adjusted under 35 U.S.C. 154(b) by 2566 days.

(21) Appl. No.: 10/092,883

(22) Filed: Mar. 8, 2002

(65) Prior Publication Data

US 2003/0169337 A1 Sep. 11, 2003

(51) Int. Cl.
G06K 9/00 (2006.01)
H04N 7/18 (2006.01)
H04N 9/47 (2006.01)

(52) U.S. Cl. .................. 382/115; 348/143; 382/103

(58) Field of Classification Search .......... 382/103, 382/115–126; 348/143
See application file for complete search history.

(56) References Cited

U.S. PATENT DOCUMENTS

| 3,999,006 | A | * | 12/1976 | Takeuchi et al. | 348/14.01 |
| 4,222,662 | A | * | 9/1980 | Kruegle | 348/343 |
| 4,449,189 | A | * | 5/1984 | Feix et al. | 382/118 |
| 4,581,634 | A | | 4/1986 | Williams | 358/108 |
| 4,712,103 | A | * | 12/1987 | Gotanda | 382/118 |
| 4,821,118 | A | * | 4/1989 | Lafreniere | 382/116 |
| 4,908,500 | A | * | 3/1990 | Baumberger | 235/384 |
| 5,053,608 | A | * | 10/1991 | Senanayake | 235/380 |
| 5,608,387 | A | * | 3/1997 | Davies | 382/118 |
| 5,682,030 | A | | 10/1997 | Kubon | 235/462 |
| 5,947,369 | A | * | 9/1999 | Frommer et al. | 235/382 |
| 6,433,818 | B1 | * | 8/2002 | Steinberg et al. | 382/116 |
| 6,446,865 | B1 | * | 9/2002 | Holt et al. | 235/382 |
| 6,504,470 | B2 | * | 1/2003 | Puchek et al. | 382/115 |
| 6,794,986 | B2 | * | 9/2004 | Puchek et al. | 340/5.53 |
| 2002/0003575 | A1 | | 1/2002 | Marchese | 348/231 |
| 2002/0040926 | A1 | | 4/2002 | Bock | 235/382 |

FOREIGN PATENT DOCUMENTS

| WO | WO 90/14640 | 11/1990 |
| WO | WO 99/36836 | 7/1999 |
| WO | WO 00/70563 | 11/2000 |

* cited by examiner

*Primary Examiner* — Matthew C Bella
*Assistant Examiner* — Manav Seth
(74) *Attorney, Agent, or Firm* — James B. Conte

(57) ABSTRACT

A video camera is located at a secure access point and is connected to a computer network. The camera is used as a conventional security camera and also provides automated assistance with access control. When an identity badge is presented to the camera by a person requesting access to the facility, a computer that is monitoring the camera recognizes a bar code or other symbols on the badge and accesses a database to locate information associated with that identity badge. This information is then used to determine if the person should be granted access.

55 Claims, 3 Drawing Sheets

ACCESS CONTROL SYSTEM WITH SYMBOL RECOGNITION

FIELD

The invention is in the field of access control, namely preventing unauthorized individuals from entering secured areas, or from accessing secured information, or from performing privileged transactions.

BACKGROUND

In the following discussion, the term 'secured area' is used generically to refer to any type of physical or virtual facility having privileged access, such as the rooms of a secure facility, or information on a computer, or functions of a computer, or the privilege to perform financial transactions. The term 'user' is used to refer to a person attempting to access a secured area.

The purpose of an access control system is to determine if a person attempting to enter a secured area is authorized to do so. There are three basic elements to validating access privileges, which can be simply summarized as "who you are", "what you know", and "what you have". Each of these elements has strengths and weaknesses. Therefore, a given access control system might use one or more of these elements, with the most secure systems requiring all three.

Access control systems that validate "who you are" most commonly require a person (such as a security guard) to verify the identity of the user. Alternatively this can be automated using biometric validation methods such as fingerprint matching, face recognition, or iris scans. The "who you are" element of security is typically the hardest to automate reliably. However "who you are" is not transferable to other individuals, in contrast to the other two elements of validating access which are easily transferred, and so more easily compromised.

Access control systems that validate "what you know" require that the user recall a password or PIN number (personal identification number). A common method to provide this information would be through a keypad attached to the access control system. This is the most common method of access control for computer usage, where the user is required to enter a username and password to gain access to the computers information and programs. This is the easiest security element to grant to a user because it does not require creating any physical entity like a key.

Access control systems that validate "what you have" require that the person carry an identity badge or access key. A conventional door lock uses this method. Magnetic card readers and radio frequency tags are other examples of access control based on "what you have". An advantage of a key entry method is that a completely mechanical solution is possible, which is ideal where electrical power is not available. A key or card is easy to transfer from one person to another.

Access control systems requiring "what you know" and "what you have" are very common. For example automated teller machines (ATMs) require that the user swipe a debit card through a magnetic card reader and also provide a PIN number. Another example is electronically locked doors leading to secure areas in airports, which often have a card reader and a keypad for entering an access code. Such systems make it very difficult for lost or stolen cards to be used to access the system.

A common problem with any automated access control system is known as 'piggy backing'. This is where one user allows several others to gain access to the secure area without requiring them to validate their authority to do so. For example, an employee may swipe their card through a reader to unlock a door and then allow several others through at the same time. In organizations with a large number of employees, it is therefore fairly easy for someone to appear as a legitimate employee and gain access to a secure area through 'piggy backing' into the area. The alternative of having a security guard at each access point is costly and not a very good utilization of the security guard's time. A security camera located at the door can act as a deterrent to 'piggy backing', but must be monitored by a security guard to be effective.

One system that attempts to address this issue is described in U.S. Pat. No. 4,581,634 issued to Williams. Williams describes a two-piece system that uses a conventional badge-reading system in combination with a camera for viewing the badge holder's face. However, the Williams apparatus requires two cameras to operate, one to read the badge and one to capture the badge holder's face. The two-camera design requires additional equipment expenses, as well as additional processing and bandwidth overhead. Also, the Williams apparatus is directed to photographic identification badges, which are at a greater risk of forgery than bar codes or symbol badges that link to an information database. Lastly, the Williams apparatus is designed to be controlled by an operator, and automating the apparatus would expose it to a security breach due to the forgery possibilities described above.

A further disadvantage of systems such as magnetic card readers and the Williams apparatus is that they require physical contact with the card and so require periodic maintenance to function reliably. They are also subject to tampering and vandalism.

U.S. Pat. No. 5,682,030 issued to Kubon describes a method and apparatus for decoding bar codes from an analog video signal. Kubon is directed to replacing traditional bar code scanners with video cameras to allow for bar code scanning at a greater distance. Kubon is limited by requiring a digitizer to handle analog signals and also by requiring a minimum 25% of the visible area to be covered by the bar code.

U.S. Patent Application Publication 2002/0003575, applied for by Marchese, describes a digital video system using networked cameras. Marchese describes a method of capturing and storing video streams from cameras on the network into single files, with indexing to search for individual images. The design allows for the individual computers on the network to access the stored images and monitor the cameras. The only security measure provided in the Marchese system is motion detection based on color component value comparisons from different images. While this type of motion detection is commonly used, it is inefficient and unwieldy for security purposes in areas that require regular access from security-cleared personnel.

The object of the present invention is to mitigate the above drawbacks by integrating the functionality of all three identity validation methods mentioned above through a security camera that is used to also read identity badges. A computer network associated with one or more cameras facilitates badge recognition, user validation, centralized management, and control of the access control system.

SUMMARY OF INVENTION

A video camera is located at a secure access point and is connected to a computer network. The camera is used as a conventional security camera and also provides automated assistance with access control. When an identity badge is presented to the camera by a person requesting access to the facility, a computer that is monitoring the camera recognizes a bar code or other symbols on the badge and accesses a database to locate information associated with that identity badge. This information is then used to determine if the person should be granted access.

For example, the information could be presented to a remote security guard who is controlling the access point to help the guard to validate that the person seen in the video image is allowed access to the secure facility. To allow access, the guard then remotely commands the door to unlock, for example through a signal to the camera to turn on a relay connected to the door's locking mechanism. Optionally, one or more images of each access attempt are stored in the database for future review in the event of any security breach.

Additionally, the guard may use an audio link supported by the network and camera to query the person who is seeking access to further verify their identity and/or reason for entering the facility. Optionally, speaker verification software is used to validate that the user's voice matches data about the users voice stored in the database. Optionally, face verification software is used to validate that the face seen by the camera is the same as the face data stored in the database.

The system may also be automated using face and/or voice verification software to eliminate the need for a remote security guard at the access control computer.

BRIEF DESCRIPTION OF THE DRAWINGS

The invention itself both as to organization and method of operation, as well as additional objects and advantages thereof, will become readily apparent from the following detailed description when read in connection with the accompanying drawings.

DETAILED DESCRIPTION

Figure 1:
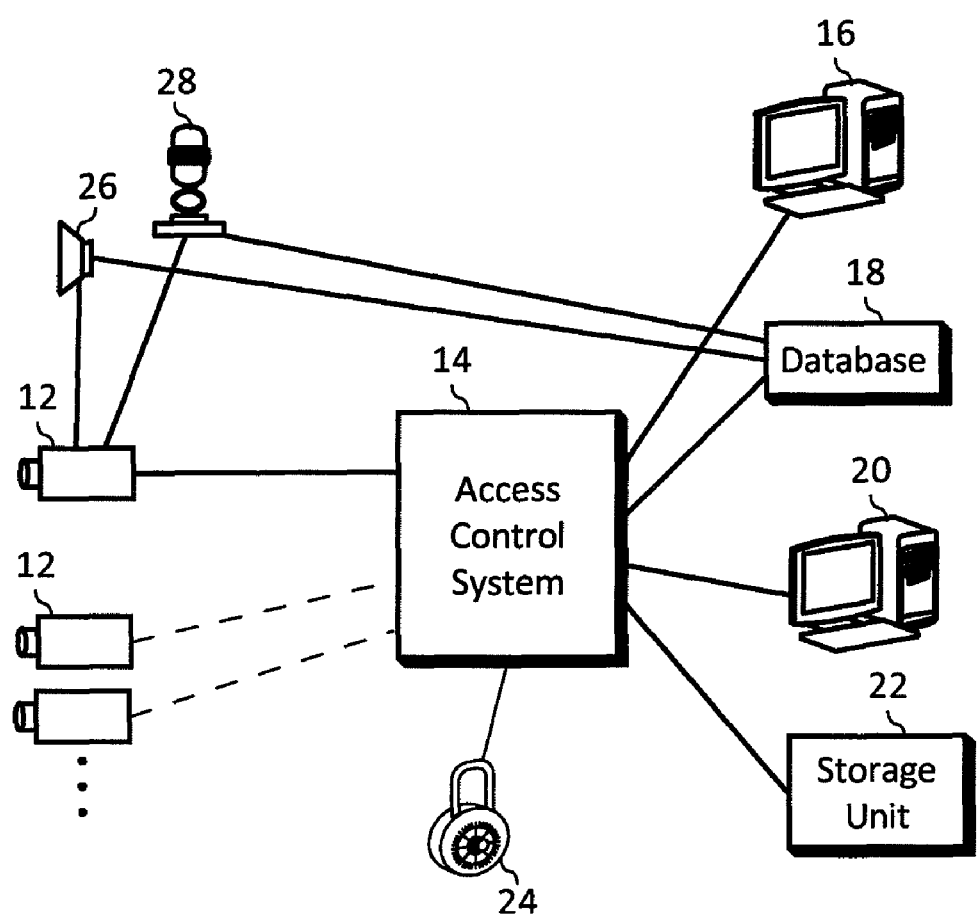
FIG. 1 is a diagram of an access control system using a digital camera.

The access control system 10 diagrammed in FIG. 1 consists of a camera 12 connected to a computer network 14. The camera 12 is designed to take digital images of identity (ID) badges 30 (shown in FIGS. 2a, 2b, and 2c) and individuals with its field of view. Also connected to the computer network 14 are a badge reading computer 16, a database 18, and an access control computer 20.

In operation, the camera 12 scans an ID badge 30 (shown in FIG. 2a) and sends the resulting digital image into the computer network 14. The badge reading computer 16 interprets the bar code 36 on the ID badge 30 and retrieves information about the badge and badge holder from the database 18. The database information is passed to the access control computer 20 where an operator determines if access is to be allowed. Alternatively, the access control computer 20 can retrieve the information from the database 18 after receiving the bar code interpretation from the badge reading computer 16. The digital images and database information may also be sent to a storage unit 22 for future reference in the event of a security breach. Once the operator determines that access is allowed, the security restraints are lifted, for example, by electronically deactivating a door lock 24.

By combining the badge reading function with the imaging function in a single camera 12, the user need not be aware that both functions are present. Therefore, the system can be used in a covert manner. For example, the system may be presented as a simple badge reader, with the user unaware that the system is also acting as an image recorder.

To provide greater interaction between the access control operator and the badge holder, an audio communication system can also be included. One-way communication 26 from the operator to the badge holder (to give instructions) or one-way communication 28 from the badge holder to the operator (to provide a voice sample for recognition) or a combination of the two may be used. The audio can be integrated into the camera 12, separately connected to the network 14 or directly sent to the access control computer 20. More generally, the audio communications elements may be configured in any fashion to meet the desired security requirements of the access control system 10.

Depending on the required level of security, and the available information in the database 18, different means of confirming the identity of the badge holder may be used. The simplest is comparison, by the operator, of the face of the badge holder in the digital image with the image on record in the database. The operator may further require the badge holder to provide a password, to match with one recorded in the database. Additional security means can be added in layers or incorporated from existing systems. For example, as opposed to unlocking a door when access is granted, the operator may instead activate a keypad, from which the badge holder must input a password or personal identification number (PIN). However, such measures are cumbersome, and are only recommended in areas where extreme levels of security are required.

The access control system 10 may be automated, eliminating the need for an operator. The access control computer 20 would then contain face verification software to compare the face in the digital image with the face stored in the database 18. In the event of a positive match, the system would then automatically allow access to the secure area. Voice verification, or a combination of voice and face verification may also be used in a similar fashion.

The recording of digital images to the storage unit 22, besides providing a record of events in case of a security breach, also allows for additional functions to be implemented in the access control system 10. For example, software could be provided on the access control computer 20, the badge reading computer 16 and/or the camera 12 that counts people using the digital images, thereby allowing the system to detect "piggy backing" attempts or similar incidents and providing a warning to the system operator or other security personnel.

Figure 2A:
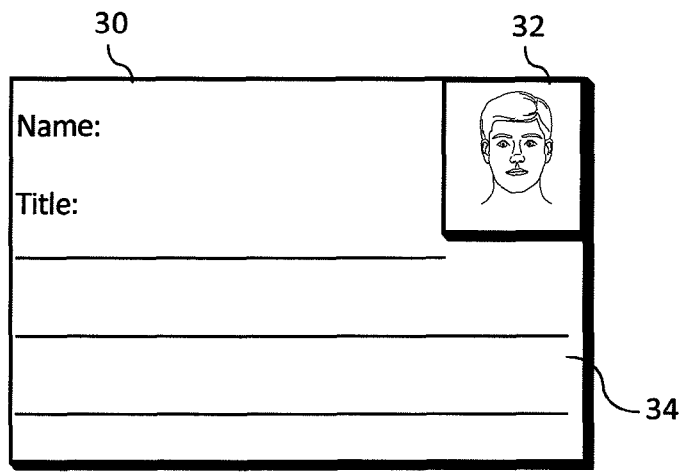
FIG. 2a is a front view of an identity badge.
Figure 2B:
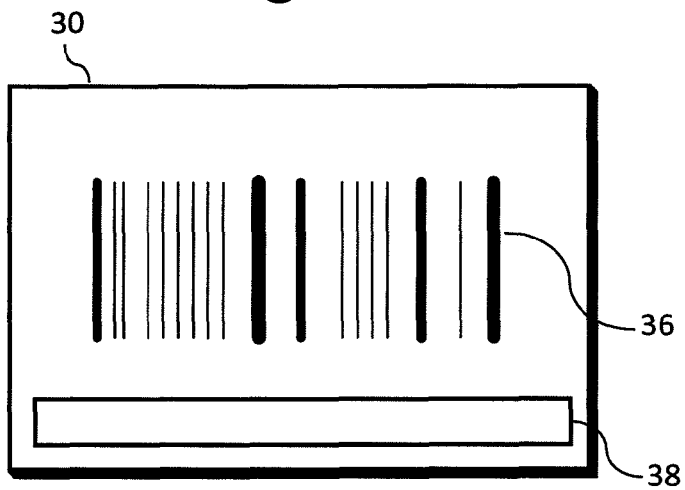
FIG. 2b is a rear view of an identity badge.
Figure 2C:
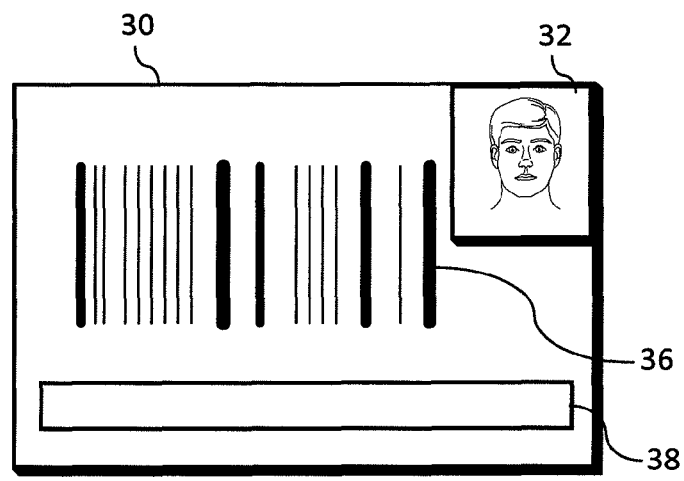
FIG. 2c is a front view of an alternate identity badge.

FIG. 2a shows a front view of a standard ID badge 30. A photograph 32 of the badge holder along with their personal information 34 (name, title, etc.) covers the surface. FIG. 2b shows a rear view of the same badge with the bar code 36 taking up the majority of the surface and magnetic strip 38 located at the bottom. The badge shown in FIGS. 2a and 2b is designed to combine all standard ID means in one badge. One alternative badge is shown in FIG. 2c, with the photograph 32, bar code 36 and magnetic strip 38 all located on the front. Obviously, different combinations of these elements are possible, and not all elements need be included. For example, with the badge holder's photograph already stored in the database 18, there is no need for the ID badge 30 to also include a photograph 32. In effect, ID badges 30 can be reduced down to only bar codes 36 if desired, although in many cases it will be more practical to include an easily recognized identifier, such as a photograph 32 or personal information 34.

Bar codes 36 are described as the most common security identifier for the ID badges 30. However, given appropriate character-recognition software, any suitable symbols can be used. For example, a company may provide "visitor" badges with a corporate logo that allow limited access to secure areas, while regular employees have bar codes, or a symbol/barcode combination. The OCR software in the badge reading computer 16 is the limiting factor in the interpretation. As digital images are used, it is also possible to differentiate badges based on color, or combination of colors. As color is identifiable at a greater distance than black and white bar codes, a badge scheme using color-coding will operate at a greater distance from the camera and require less of the badge in the field of view.

By using bar codes or other symbols, the amount of information gleaned from the badge 30 is minimized. This acts to make duplication or forgeries of badges 30 ineffective as a means of gaining illegal access, because without a corresponding modification of the database 18, the duplicate/forgery is worthless.

Other combinations of cameras and computers may be used. For example, an access control system with a single camera may incorporate the badge reading functions into the camera 12, and combine the database 18 and video storage 22 into the access control computer 20. Alternatively, all network functions (badge reading, database, video storage, and access control) can be combined into a single computer connected to one or more cameras. The result of combining multiple functions into single components is an access control system that provides all the desired functionality with a minimum number of disparate components and at a typically reduced cost.

By contrast, a large access control system could require a large number of cameras 12. In this case, the cameras 12 would simply transmit images, to minimize the cost of the individual cameras 12. Multiple cameras 12 may further require multiple access control computer 20 tied into the computer network 14. The database 18 and video storage 22 are maintained separately to allow any access control computer 20 to retrieve required information. The badge reading computer 16 can be either part of the access control computer 20 or a separate element depending on the desired nature of the system and which combination optimizes network bandwidth use and system costs.

The symbol recognition can also be used to extend the functionality of the access control system 10. For example, a badge 30 could have a symbol pattern that is used to signal that a camera 12 is authorized for a remote software update, and specify which version of software the camera should fetch and from where on the network. Similarly, a badge 30 could be used to change the operating mode of a camera 12 by holding up a badge 30 specifying the mode parameters, and the authorization code to modify those parameters.

Furthermore, the access control system 10 could be used for personnel tracking. A security guard could signal his presence in the area near a camera 12 by showing his badge 30 to the camera 12. Knowing the whereabouts of security personnel can be especially helpful in the event of an emergency where the people closest to the area needing attention can be quickly determined and notified.

Figure 3:
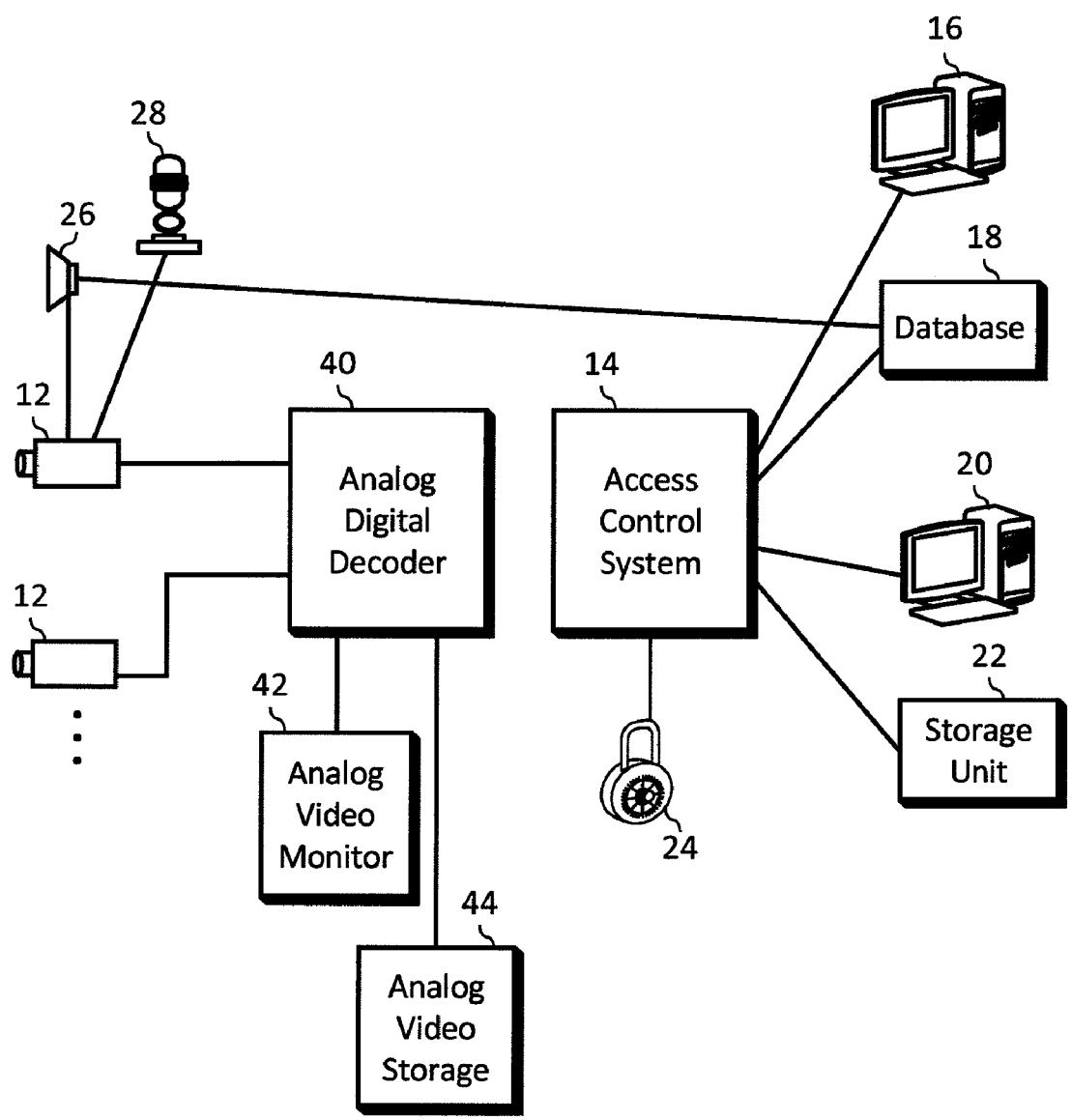
FIG. 3 is a diagram of an access control system using an analog camera.

In an alternative embodiment shown in FIG. 3, the access control system 10 may use a camera or cameras 12 that provide analog images instead of digital images. In this case, the analog images are sent from the camera 12 to an analog/digital decoder 40 which coverts the analog images into digital images. The digital images are the passed to the computer network 14 and the process continues as described above for FIG. 1. The access control system 10 may also include an analog video monitor 42 and analog video storage 44, for viewing and recording of the original analog images, if desired.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:
1. An access control system, comprising:
(a) a plurality of identity badges including symbols located on each identity badge;
(b) a computer network for exchanging information between devices connected to said computer network;
(c) a video camera coupled to said computer network and operative to record digital images and send said digital images over said computer network;
(d) a badge reading computer connected to said computer network, said badge reading computer having access to said digital images and operative to execute symbol recognition software to identify said symbols on said identity badges from said digital images;
(e) a database coupled to said badge reading computer containing identity information and access control information associated with said symbols on each said identity badge; and
(f) an access control computer connected to said computer network, operative to receive badge identity data from said badge reading computer and control access to a secure area,
wherein said database further comprises camera control information associated with said symbols on each said identity badge for initiating reprogramming of said camera and said access control computer is operative to reprogram said camera based on the cameral control information.

2. An access control system according to claim 1, wherein said symbols are bar codes.

3. An access control system according to claim 1, wherein said symbols are color-coded.

4. An access control system according to claim 1, wherein access to said secure area is controlled by an electronic door lock which receives control messages from said access control computer over said computer network.

5. An access control system according to claim 1, further comprising a two-way audio system to allow a person stationed at said access control computer and a person located near said video camera to communicate bi-directionally.

6. An access control system according to claim 1, further comprising a one-way audio system to allow a person stationed at said access control computer to communicate with a person located near said video camera.

7. An access control system according to claim 1, further comprising a one-way audio system to allow a person located near said video camera to communicate with a person stationed at said access control computer.

8. An access control system according to claim 1, further including a video recording system operative to record said digital images, said user information and said access control information.

9. An access control system according to claims 8, wherein said video recording system also records an audio feed from the area shown in said digital images.

10. An access control system according to claim 1, wherein said access control computer uses face verification software on said digital images to control access.

11. An access control system according to one of claims 5, wherein said access control computer uses voice verification to control access.

12. An access control system according to claim 1, wherein said access control computer is automated and capable of controlling access without an operator.

13. An access control system according to claim 1, wherein said access control computer is monitored and controlled by an operator.

14. An access control system according to claim 1, wherein said access control computers counts the number of badges viewed and the number of persons who gain access.

15. An access control system according to claim 1, wherein a plurality of video cameras are connected to said computer network.

16. An access control system according to claim 1, wherein said badge reading computer and said access control computer are integrated into one computer.

17. An access control system according to claim 1, wherein said badge reading computer, said database and said access control computer are integrated into one computer.

18. An access control system according to claim 1, wherein said badge reading computer is integrated into said camera.

19. An access control system according to claim 1, wherein said badges and said symbols can be used to reprogram one of said camera, said badge reading computer, said access control computer, and a combination thereof.

20. An access control system, comprising:
(a) a plurality of identity badges including symbols located on each identity badge;
(b) a computer network for exchanging information between devices connected to said computer network;
(c) a video camera operative to record and send analog images;
(d) an analog-to-digital converter coupled to said computer network, operative to convert said analog images to digital images, said digital images then sent over said computer network;
(e) a badge reading computer connected to said computer network, said badge reading computer having access to said digital images and operative to execute symbol recognition software to identify said symbols on said identity badges from said digital images;
(f) a database coupled to said badge reading computer containing identity information and access control information associated with said symbols on each said identity badge; and
(g) an access control computer connected to said computer network, operative to receive badge identity data from said badge reading computer and control access to a secure area,
wherein said database further comprises camera control information associated with said symbols on each said identity badge for initiating reprogramming of said camera and said access control computer is operative to reprogram said camera based on the cameral control information.

21. An access control system according to claim 20, wherein said symbols are bar codes.

22. An access control system according to claim 20, wherein said symbols are color-coded.

23. An access control system according to claim 20, wherein access to said secure area is controlled by an electronic door lock which receives control messages from said access control computer over said computer network.

24. An access control system according to claim 20, further comprising a two-way audio system to allow a person stationed at said access control computer and a person located near said video camera to communicate bi-directionally.

25. An access control system according to claim 20, further comprising a one-way audio system to allow a person stationed at said access control computer to communicate with a person located near said video camera.

26. An access control system according to claim 20, further comprising a one-way audio system to allow a person located near said video camera to communicate with a person stationed at said access control computer.

27. An access control system according to claim 20, further including a video recording system operative to record said digital images, said user information and said access control information.

28. An access control system according to claims 27, wherein said video recording system also records an audio feed from the area shown in said digital images.

29. An access control system according to claim 20, wherein said access control computer uses face verification software on said digital images to control access.

30. An access control system according to one of claims 24, wherein said access control computer uses voice verification to control access.

31. An access control system according to claim 20, wherein said access control computer is automated and capable of controlling access without an operator.

32. An access control system according to claim 20, wherein said access control computer is monitored and controlled by an operator.

33. An access control system according to claim 20, wherein said access control computers counts the number of badges viewed and the number of persons who gain access.

34. An access control system according to claim 20, wherein a plurality of video cameras are connected to said computer network.

35. An access control system according to claim 20, wherein said badge reading computer and said access control computer are integrated into one computer.

36. An access control system according to claim 20, wherein said badge reading computer, said database and said access control computer are integrated into one computer.

37. An access control system according to claim 20, wherein said badge reading computer is integrated into said camera.

38. An access control system according to claim 20, wherein said badges and said symbols can be used to reprogram one of: said camera, said badge reading computer, said access control computer, and a combination thereof.

39. A method of controlling access to a secure area, comprising:
(a) recording a digital image of a person and an identity badge with a camera;
(b) transmitting said digital image to a computer;
(c) retrieving identity information and access control information from a database based on symbols on said identity badge;

(c1) retrieving cameral control information associated with said symbols;

(d) comparing said identity information with said person in said digital image;

(e) allowing access when a positive result arises from said comparison step; and (f) reprogramming said camera based on the camera control information.

40. The method of claim 39, wherein said comparison step is performed by a human operator.

41. The method of claim 40, wherein said comparison step is based on face verification.

42. The method of claim 40, wherein said comparison step is based on voice verification.

43. The method of claim 39, wherein said comparison step is automatically performed by a computer.

44. The method of claim 43, wherein said comparison step is based on face verification.

45. The method of claim 43, wherein said comparison step is based on voice verification.

46. An access control system according to claim 7, wherein said access control computer uses voice verification to control access.

47. An access control system according to claim 26, wherein said access control computer used voice verification to control access.

48. The access control system according to claim 1, wherein said camera control information comprises control information for authorizing a remote software update for said camera and the said access control computer is operative to obtain a remote software update for said camera based on said control information.

49. The access control system according to claim 48, wherein said control information for authorizing a remote software update for said camera comprises control information for specifying a current version of the remote software update and the source of the remote software update.

50. The access control system according to claim 1, wherein said camera control information comprises control information for initiating changing the operating mode of said camera and said access control computer is operative to change the operating mode of said camera based on said control information.

51. The access control system according to claim 50, wherein said control information for initiating changing the operating mode of said camera comprises control information for specifying mode parameters of said camera and authorization code to modify the mode parameters.

52. The access control system according to claim 20, wherein said camera control information comprises control information for authorizing a remote software update for said camera and the said access control computer is operative to obtain a remote software update for said camera based on said control information.

53. The access control system according to claim 52, wherein said control information for authorizing a remote software update for said camera comprises control information for specifying a current version of the remote software update and the source of the remote software update.

54. The access control system according to claim 20, wherein said camera control information comprises control information for initiating changing the operating mode of said camera and said access control computer is operative to change the operating mode of said camera based on said control information.

55. The access control system according to claim 54, wherein said control information for initiating changing the operating mode of said camera comprises control information for specifying mode parameters of said camera and authorization code to modify the mode parameters.

* * * * *